(12) United States Patent
Langenfeld

(10) Patent No.: US 6,550,244 B1
(45) Date of Patent: *Apr. 22, 2003

(54) AXLE DRIVING APPARATUS HAVING AN IMPROVED HYDRAULIC FLUID BYPASS MECHANISM

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/102,781

(22) Filed: Mar. 21, 2002

Related U.S. Application Data

(63) Continuation of application No. 09/710,235, filed on Nov. 9, 2000, now Pat. No. 6,370,876.

(51) Int. Cl.⁷ .......................... F16D 39/00; F16D 31/02
(52) U.S. Cl. ............................................ 60/487; 60/494
(58) Field of Search ............................ 60/468, 487, 494

(56) References Cited

U.S. PATENT DOCUMENTS

| | | |
|---|---|---|
| 3,360,933 A | 1/1968 | Swanson et al. |
| 5,201,692 A | 4/1993 | Johnson et al. |
| 5,394,699 A | 3/1995 | Matsufuji |
| 5,771,758 A | 6/1998 | Hauser |
| 5,782,142 A | 7/1998 | Abend et al. |
| 5,782,717 A | 7/1998 | Smothers et al. |
| 5,819,537 A | 10/1998 | Okada et al. |
| 5,836,159 A | 11/1998 | Shimizu et al. |
| 5,950,500 A | 9/1999 | Okada et al. |
| 5,957,229 A | 9/1999 | Ishii |
| 6,145,312 A | 11/2000 | Hauser et al. |
| 6,370,876 B1 * | 4/2002 | Langenfeld .................. 60/487 |

* cited by examiner

*Primary Examiner*—Edward K. Look
*Assistant Examiner*—Michael Leslie
(74) *Attorney, Agent, or Firm*—Altheimer & Gray

(57) ABSTRACT

A mechanism for bypassing the flow of hydraulic fluid in a hydrostatic transmission comprised of a hydraulic pump and a hydraulic motor in fluid communication through a center section. The mechanism includes a bypass actuator rod that is moved from a first position to a second position to thereby move a plate into the hydraulic motor to lift the hydraulic motor off of the center section. The bypass actuator rod may has a generally flat surface and an opposite arcuate surface wherein the generally flat surface of the bypass actuator is positioned adjacent to the plate in the first position and the arcuate surface of the bypass actuator engages the plate in the second position. When the bypass actuator rod is in the first position the hydraulic motor is in substantial sealed engagement with the center section. When the bypass actuator rod is in the second position the hydraulic motor is lifted off of the center section and any forces applied to the actuator rod by the lifted hydraulic motor are directed substantially through the axis of the bypass actuator rod.

10 Claims, 5 Drawing Sheets

AXLE DRIVING APPARATUS HAVING AN IMPROVED HYDRAULIC FLUID BYPASS MECHANISM

RELATED APPLICATION

This application claims the benefit of and is a continuation of U.S. application Ser. No. 09/710,235 filed on Nov. 9, 2000, now U.S. Pat. No. 6,370,876 which is incorporated herein by reference in its entirety.

BACKGROUND OF THE INVENTION

This invention relates generally to axle driving apparatus and, more particularly, to a transaxle and hydrostatic transmission assembly having an improved hydraulic fluid bypass mechanism.

Transaxle and hydrostatic transmission assemblies ("HSTs") are known in the art. Generally, an HST includes a center section on which is mounted a hydraulic pump and a hydraulic motor. The hydraulic pump and the hydraulic motor each carry a plurality of reciprocating pistons which are in fluid communication through hydraulic porting formed in the center section. Rotation of the hydraulic pump by an engine creates an axial motion of the pump pistons which forces an operating oil through the hydraulic porting to the hydraulic motor to move the motor pistons. The axial motion of the motor pistons causes the hydraulic motor to rotate as the motor pistons bear against a thrust bearing. In this manner, the rotation of the hydraulic motor may be used to drive the vehicle axles of a riding lawn mower, small tractor and the like.

For allowing the vehicle to roll or freewheel without resistance from the hydraulic fluid, it is also known in the art to include a hydraulic fluid bypass mechanism in an HST. By way of example, U.S. Pat. Nos. 5,201,692 and 5,819,537, which are incorporated herein by reference in their entirety, disclose a hydraulic fluid bypass mechanism that functions by lifting the hydraulic motor off the motor running surface of the center section to break the hydraulic fluid circuit that circulates operating oil between the hydraulic pump and the hydraulic motor. To activate this feature, a bypass arm is manipulated to rotate a bypass actuator. The bypass actuator includes a rod which is shaped with a flat surface formed along a part of the outer periphery of its lower end. Rotation of the rod forces the corner of the flat surface to press a plate or pin against the base of the hydraulic motor to thereby break the hydraulic seal between the hydraulic motor and the center section.

To prevent damage to the components that comprise the hydraulic motor, in particular, to the piston springs, the hydraulic fluid bypass mechanisms of the types disclosed in U.S. Pat. Nos. 5,201,692 and 5,819,537 require the rotational movement of the actuator rod to be limited. Limiting the rotational movement of the actuator rod is required as it limits the distance into the space of the plate or pin the corner of the flat surface of the actuator rod travels which, in turn, limits the distance into the space of the hydraulic motor that the plate or pin travels. For this purpose, the hydraulic fluid bypass mechanism disclosed in U.S. Pat. No. 5,201,692 uses a stop formed on the actuator rod to place a limit on the rotational movement of the actuator rod. Similarly, although not illustrated, the hydraulic fluid bypass mechanism disclosed in U.S. Pat. No. 5,819,537 uses externally mounted pins that cooperate with an actuator handle to stop the movement of the actuator rod. In accordance with either approach, the movement of the actuator rod is limited such that the flat surface of the actuator rod engages the plate or pin at an angle generally less than 90 degrees at the point at which the corner achieves the maximum allowable displacement of the plate or pin.

While these known hydraulic fluid bypass mechanisms do work for their intended purpose, they suffer the disadvantage of requiring a manual or mechanical means by which the actuator rod may be maintained in a position that results in the breaking of the hydraulic circuit. Since the rotational movement of the rod is limited and the flat surface of the rod meets the plate or pin at an angle, the actuator rod is subjected to a restoring torque as the hydraulic motor assembly, which is biased by its piston springs, seeks to return to the position where it sits flush upon the motor running surface of the center section. Thus, the manual or mechanical means is required to maintain the position of the actuator rod against the restoring torque that would otherwise force the actuator rod to a position that does not create a break in the hydraulic circuit.

SUMMARY OF THE INVENTION

To eliminate the effects of restoring torque on a mechanical bypass mechanism, an improved mechanism for bypassing the flow of hydraulic fluid in a hydrostatic transmission is provided. The mechanism includes a bypass actuator rod that is moved from a first position to a second position to thereby move a plate against the hydraulic motor to lift the hydraulic motor off of the center section. The bypass actuator rod has a generally flat surface and an opposite arcuate surface wherein the generally flat surface of the bypass actuator is positioned generally adjacent and parallel to the plate in the first position and the arcuate surface of the bypass actuator engages the plate in the second position. When the bypass actuator rod is in the first position the hydraulic motor is in substantial sealed engagement with the center section. When the bypass actuator rod is in the second position the hydraulic motor is lifted off of the center section and any forces applied to the actuator rod by the lifted hydraulic motor are directed substantially towards the axis of the bypass actuator rod.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION OF THE DRAWINGS

Figure 1:
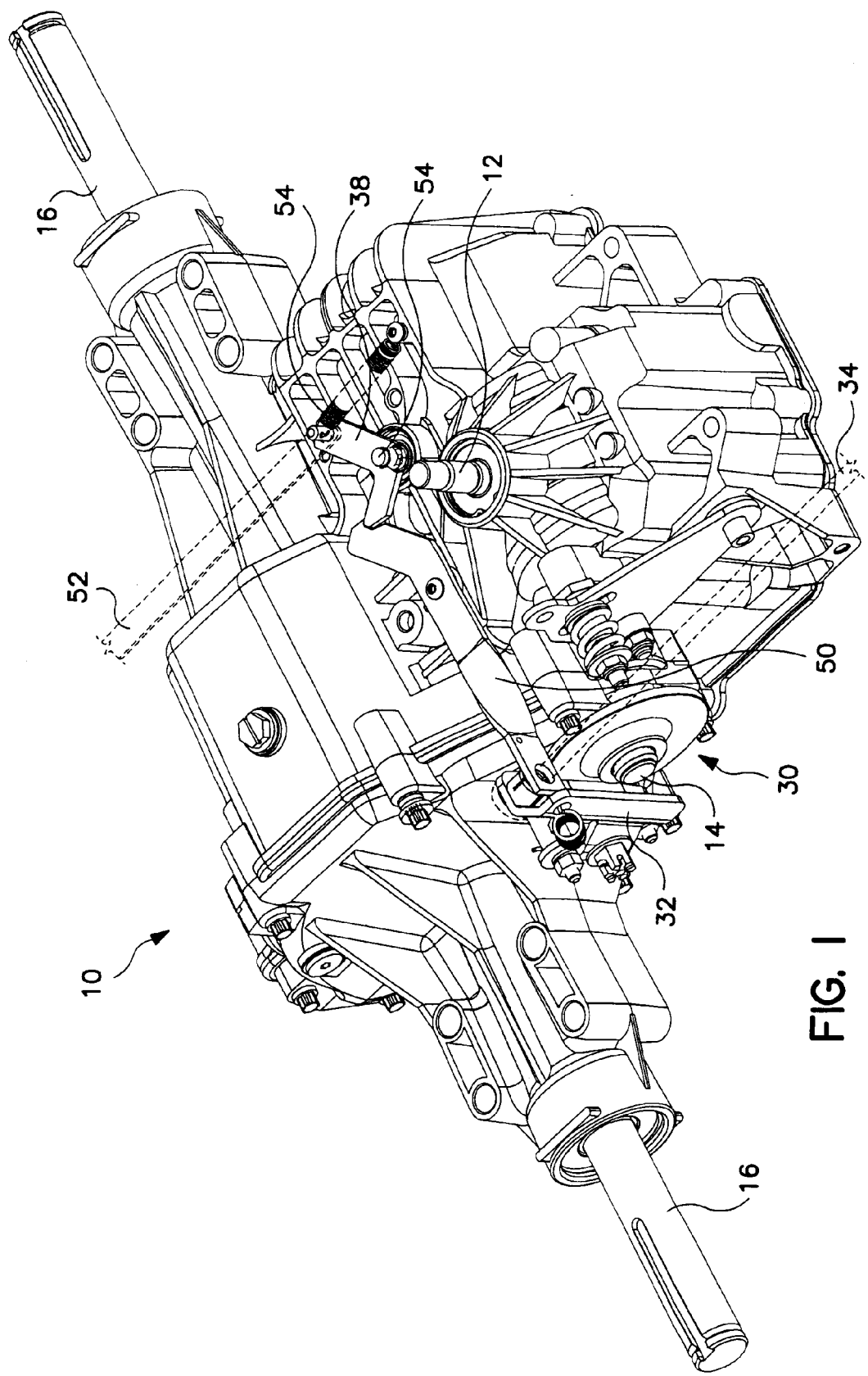
FIG. 1 illustrates an isometric view of an exemplary HST in which the bypass mechanism of the subject invention may reside.
Figure 2:
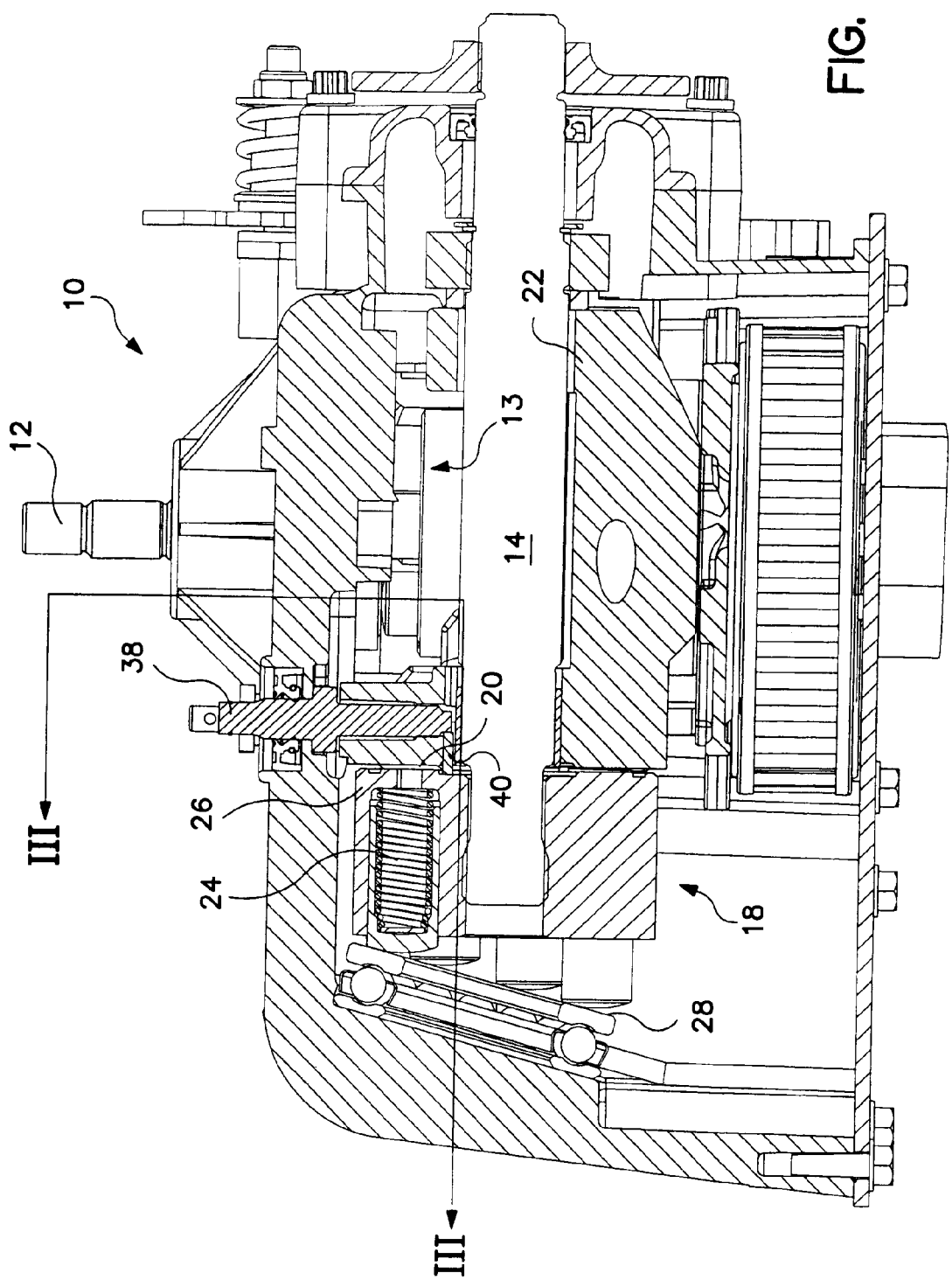
FIG. 2 illustrates a cross sectional view of the HST of FIG. 1 particularly showing an exemplary bypass mechanism in the full-bypass position constructed in accordance with the principles of the subject invention.
Figure 3:
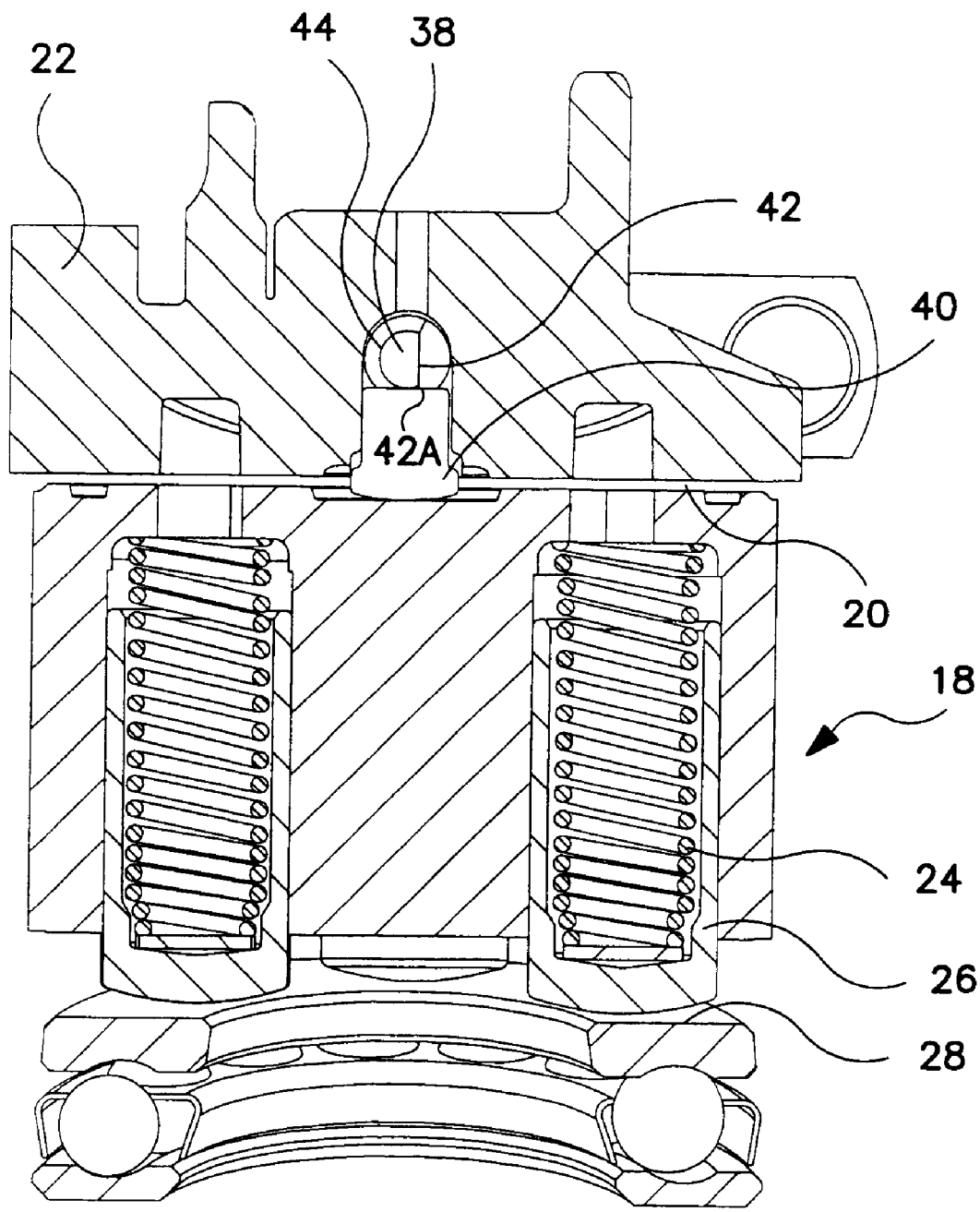
FIG. 3 illustrates a cross sectional view of the exemplary bypass mechanism illustrated in FIG. 2.

Turning now to the figures, wherein like reference numeral refer to like elements, there is illustrated an axle driving apparatus in the form of a hydrostatic transmission ("HST") 10. In this regard, the illustrated HST 10 operates on the principle of an input shaft 12 driving a hydraulic pump 13 which, through the action of its pistons, pushes oil to a hydraulic motor 18 through a center section to cause the rotation of a motor shaft 14. The rotation of the motor shaft 14 is eventually transferred through a gearing system or the like to drive one or a pair of axle shafts 16. For a more detailed description of the operation of such an HST 10, the reader is referred to U.S. Pat. No. 5,201,692.

For driving the motor shaft 14, the hydraulic motor 18 is rotatably mounted on a motor running surface 20 of a center section 22 that contains the hydraulic porting that places the hydraulic motor 18 in fluid communication with the hydraulic pump 13. During a condition of non-bypass, the hydraulic motor 18 is in substantial sealed engagement with the motor running surface 20. The substantial sealed engagement results from the forces that are placed upon the hydraulic motor 18 as the motor piston springs 24 cause the motor pistons 26 to press against a thrust bearing 28. When the HST 10 is in operation, there is an additional force that urges the hydraulic motor 18 against the motor running surface 20 resulting from the pressure of the oil.

For use in braking the motor shaft 14 when the HST 10 is in operation, the HST 10 includes a braking mechanism 30. As illustrated in FIG. 1, the braking mechanism 30 is located on, and supported by the motor shaft 14. The braking mechanism 30 may be actuated by means of a brake arm 32 which may be connected via a linkage 34 to a brake pedal, brake handle, or the like.

In accordance with an important aspect of the invention, the HST 10 includes a bypass mechanism 36 for use in breaking the substantial sealed engagement between the hydraulic motor 18 and the motor running surface 20 of the center section 22. By breaking the substantial sealed engagement between the hydraulic motor 18 and the motor running surface 20 of the center section 22, the bypass mechanism enables the vehicle on which the HST 10 is mounted to roll or freewheel without suffering resistance caused by induced movement of the hydraulic fluid in the hydraulic circuit. With reference to FIGS. 2–5, the bypass mechanism 36 includes a bypass actuator rod 38 and plate, bread, pin, or the like 40 (hereinafter collectively referred to as "the plate") that cooperate to lift the hydraulic motor 18 off of the motor running surface 20 of the center section 22 to allow oil to flow out of the hydraulic circuit and into a transmission cavity. For this purpose, the bypass actuator rod 38 includes a flat surface 42 ending in a comer 42A and an arcuate surface 44 that are adapted to engage the plate 40.

Figure 4:
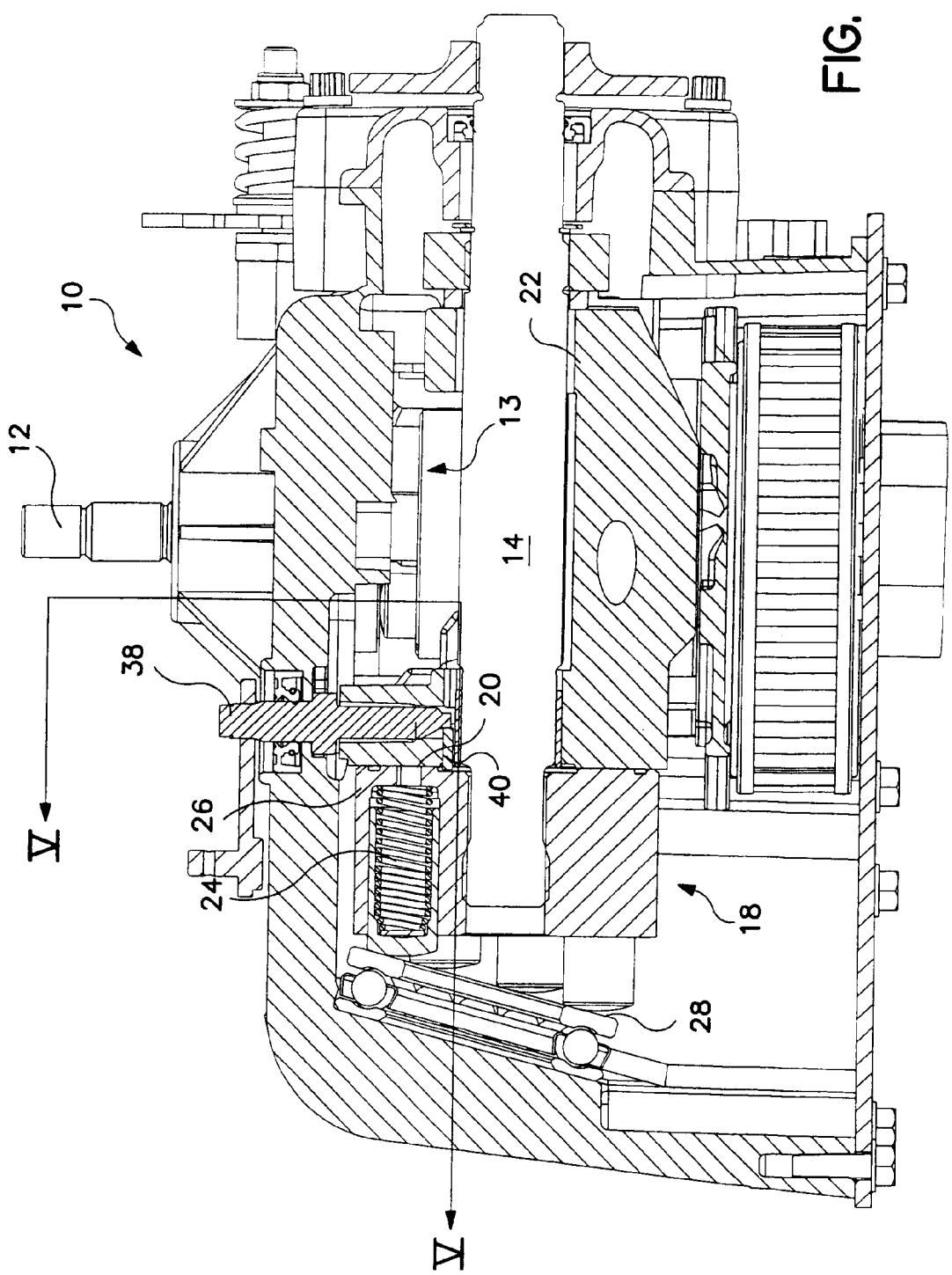
FIG. 4 illustrates a cross sectional view of the HST of FIG. 1 particularly showing the exemplary bypass mechanism of FIG. 2 in the non-bypass position.
Figure 5:
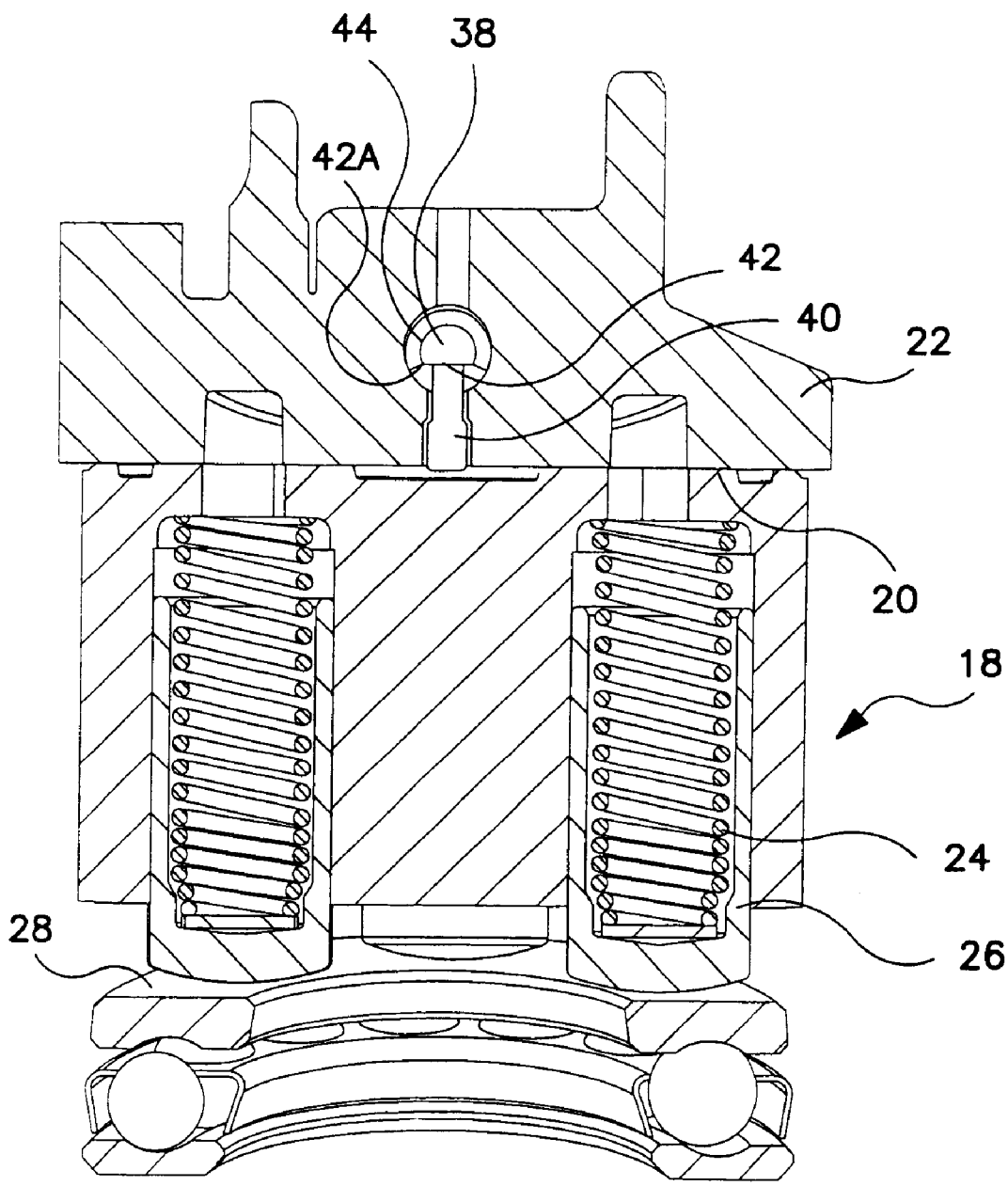
FIG. 5 illustrates a cross sectional view of the exemplary bypass mechanism illustrated in FIG. 4.

To lift the hydraulic motor 18 off of the motor running surface 20 of the center section 22, the bypass actuator rod 38 is rotated from its non-bypass position, illustrated in FIGS. 4 and 5, such that the comer 42A moves into the space normally occupied by the plate 40. As the comer 42A engages the plate 40 in this manner, the plate 40 is forced into the space normally occupied by the hydraulic motor 18 to thereby move the hydraulic motor 18 away from the motor running surface 20. In the non-bypass position, the flat surface 42 of the bypass actuator rod 38 is positioned adjacent and parallel to the plate 40, i.e., is positioned relative to the plate 40 at an angle of generally zero degrees. As the bypass actuator rod 38 is rotated, the angle at which the flat surface 42 of the bypass actuator rod 38 meets the plate 40 increases. During this process, the plate 40, under the influence of the piston springs 24, imparts a restoring torque on the bypass actuator rod 38.

To eliminate the effects of the restoring torque on the bypass actuator rod 38, the bypass actuator rod 38 may be moved to a full-bypass position in which the flat surface 42 of the bypass actuator rod 38 clears the plate 40. More specifically, in the full-bypass position, the bypass actuator rod 38 is rotated such that the arcuate surface 44 of the bypass actuator rod 38 engages and holds the plate 40 in a position that lifts the hydraulic motor 18 off of the motor running surface 20. In this position, the effects of the restoring torque are eliminated since the plate 40, under the influence of the piston springs 24, imparts a force on the bypass actuator rod 38 that is directed substantially towards the center axis of the bypass actuator rod 38. While illustrated as being moved in the counter-clockwise direction, the bypass actuator rod can be moved in the clockwise direction to achieve the same results.

For allowing the bypass actuator 38 to be rotated to the full-bypass position without causing undue stress upon the components of hydraulic motor 18 or the bypass mechanism 36, the arcuate surface 44 of the actuator bypass rod 38 may be provided with a controlled cross sectional diameter that is less than the cross sectional diameter of the actuator bypass rod 38 itself. The controlled cross sectional diameter of the actuator bypass rod 38 may be achieved by providing the actuator bypass rod with a chamfered surface that leads to the arcuate surface 44 and flat surface 42. Alternatively, the whole of the actuator bypass rod 38, including the arcuate surface 44, may be provided with a controlled cross-sectional diameter. In either case, the controlled cross sectional measurement is selected to limit the distance the hydraulic motor 18 is moved when the actuator rod is placed in the full-bypass position such that the amount of force that results from the engagement of the hydraulic motor 18 with the thrust bearing 18 is insufficient to cause damage to the piston springs 24 and/or the motor cylinder block, the plate 18, and the actuator bypass rod 38 in their state of engagement.

To activate the bypass mechanism, a bypass arm 48 is provided to rotationally drive the bypass actuator rod 38. The bypass arm 48 may be driven by a bypass latching arm 50 that is pivotally mounted to the housing of the HST 10. The bypass latching arm 50 is adapted to rotate the bypass arm 48 and, accordingly, the bypass actuator rod 38, in response to activation of the braking mechanism 30 through the linkage 34. Alternatively, a linkage 52 can be provided for manual rotation of the bypass arm 48. Once activated, the bypass mechanism will maintain the hydraulic motor 18 in a bypass condition until the bypass arm 48 is rotated in the reverse direction. Furthermore, since the effects of the restoring torque have been eliminated, when the bypass mechanism is in the full-bypass position, the need for providing a means to hold the bypass mechanism in the full-bypass position is also eliminated. Nevertheless, if a spring 54 is used to assist the return of the bypass mechanism to a non-bypass position, a non-manual means for helping the bypass mechanism maintain the full-bypass position may be desirable when the bypass mechanism is placed in the full-bypass position by manual activation.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. For use in connection with a hydrostatic transmission comprised of a hydraulic pump having pump pistons and a hydraulic motor having motor pistons in fluid communication through a center section, a bypass mechanism comprising:

a rotatable bypass actuator rod having a generally flat surface and an opposite generally arcuate surface; and a plate positioned adjacent to the bypass actuator rod and moveable in response to rotation of the bypass actuator rod from a first position, in which the generally flat surface of the bypass actuator rod is positioned adjacent to the plate and the plate and the hydraulic motor generally impart no force upon the bypass actuator rod, to a second position, in which the plate lifts the hydraulic motor from the center section and the hydraulic motor and the plate generally impart a force on the arcuate surface of the bypass actuator rod that is directed towards the axis of the bypass actuator rod.

2. The bypass mechanism as recited in claim 1, wherein the bypass actuator rod has a chamfered surface that leads to the generally flat surface and the opposite generally arcuate surface.

3. A hydrostatic transmission, comprising:

a hydraulic motor having motor pistons;

a center section on which the hydraulic motor is rotatably mounted;

a rotatable bypass actuator rod having a generally flat surface and an opposite generally arcuate surface; and a plate positioned adjacent to the bypass actuator rod and moveable in response to rotation of the bypass actuator rod from a first position, in which the generally flat surface of the bypass actuator rod is positioned adjacent to the plate and the plate and the hydraulic motor generally impart no force upon the bypass actuator rod, to a second position, in which the plate lifts the hydraulic motor from the center section and the hydraulic motor and the plate generally impart a force on the arcuate surface of the bypass actuator rod that is directed towards the axis of the bypass actuator rod.

4. The bypass mechanism as recited in claim 3, wherein the bypass actuator rod has a chamfered surface that leads to the generally flat surface and the opposite generally arcuate surface.

5. A method for bypassing hydraulic fluid in a hydrostatic transmission comprised of a hydraulic pump and a hydraulic motor in fluid communication through a center section, the method comprising:

moving a bypass actuator from a first position to a second position to move the hydraulic motor relative to the center section where in the first position the hydraulic motor is in substantial sealed engagement with the center section, during the transition from the first position to the second position the hydraulic motor is being lifted off the center section and imparts a force upon the bypass actuator influencing the bypass actuator towards the first position, and in the second position the hydraulic motor is lifted off of the center section and the bypass actuator is no longer influenced to move towards the first position by the force imparted upon the bypass actuator by the hydraulic motor.

6. The method as recited in claim 5, further comprising moving a plate with the bypass actuator to move the hydraulic motor.

7. The method as recited in claim 5, wherein the hydraulic motor generally imparts no force upon the bypass actuator in the first position.

8. The method as recited in claim 5, further comprising rotating the bypass actuator from the first position to the second position.

9. A hydrostatic transmission, comprising:

a hydraulic motor;

a center section on which the hydraulic motor is rotatably mounted; and a bypass actuator moveable between a first position and a second position to engage and move the hydraulic motor relative to the center section where in the first position the hydraulic motor is in substantial sealed engagement with the center section and the hydraulic motor generally imparts no force upon the bypass actuator, during the transition from the first position to the second position the hydraulic motor is being lifted off the center section and imparts a force upon the bypass actuator influencing the bypass actuator towards the first position, and in the second position the hydraulic motor is lifted off of the center section and the bypass actuator is no longer influenced to move towards the first position by the force imparted upon the bypass actuator by the hydraulic motor.

10. The hydrostatic transmission as recited in claim 9, further comprising a plate disposed between the bypass actuator and the hydraulic motor.

* * * * *

UNITED STATES PATENT AND TRADEMARK OFFICE
CERTIFICATE OF CORRECTION

PATENT NO. : 6,550,244 B1  
DATED : April 22, 2003  
INVENTOR(S) : Thomas J. Langenfeld It is certified that error appears in the above-identified patent and that said Letters Patent is hereby corrected as shown below:

Column 1,  
Line 55, "comer" should be -- corner --

Column 3,  
Lines 47, 52 and 53, "comer" should be -- corner --

Signed and Sealed this

Twelfth Day of August, 2003

JAMES E. ROGAN  
*Director of the United States Patent and Trademark Office*